Patented Nov. 21, 1950

2,530,497

UNITED STATES PATENT OFFICE 2,530,497

PRODUCTION OF PENTAZDIENES

John E. Wicklatz, Cincinnati, Ohio, assignor to Phillips Petroleum Company, a corporation of Delaware No Drawing. Application June 5, 1947,
Serial No. 752,838

12 Claims. (Cl. 260—140)

This invention relates to the production of pentazdienes. In a preferred embodiment it relates to producing high yields of pentazdienes. One particular embodiment of this invention relates to the production of 1,5-diaryl-1,4-pentazdienes.

In the preparation of pentazdienes the synthesis usually comprises the diazotization of an amine followed by a reaction wherein an amine is coupled with the diazonium compound prepared earlier. According to general practice both the diazotization and coupling steps have been carried out in the presence of methanol which serves as a solvent for the amine as well as the diazo solution. While both steps of the synthesis proceed in a fairly smooth manner when this method of operation is employed, there are certain inherent defects in the procedure, the chief drawback being the small yields of pentazdienes obtained; namely, in the range of 10 to 20 per cent of theoretical. Inasmuch as these materials have now assumed importance in the production of synthetic rubber, and similar materials of high molecular weight, it is imperative that a more economical method be available which is applicable to large scale production. Pentazdienes are known to be unstable and are particularly sensitive to certain solvents, such as, for example, methanol, which has heretofore been employed as the reaction medium.

I have now found a method whereby pentazdienes may be produced in a satisfactory manner and higher yields obtained than have heretofore been possible. The method comprises carrying out the reaction in the presence of a water-soluble compound which serves particularly as a promoter for the reaction and minimizes the tendency of the products to undergo decomposition, said compound being selected from the group consisting of hydroxy and alkoxy ethers, both straight-chain and cyclic.

An object of this invention is to produce pentazdienes.

Another object of this invention is to produce 1,5-diaryl-1,4-pentazdienes.

Still another object of this invention is to produce 1,5-diaryl-1,4-pentazdienes carrying a substituent other than hydrogen on the middle nitrogen atom.

A further object of this invention is to obtain high yields of pentazdienes.

Other objects and advantages of this invention will become apparent, to one skilled in the art, from the accompanying disclosure and discussion.

The pentazdienes which can be produced by this invention may be represented by the formula

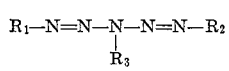

wherein $R_1$ and $R_2$ are aryl or substituted aryl radicals in which the substituents may be alkyl, cycloalkyl, aryl, alkoxy, halo, nitro, cyano, and the like, wherein $R_1$ and $R_2$ may be either alike or different, and wherein $R_3$ is a monovalent radical, preferably hydrogen, an alkyl, aryl, or cycloalkyl, or a substituted derivative of such a group. Some examples of these compounds are: 1,3,5-triphenyl-1,4-pentazdiene, 1,5-di-p-tolyl-3-lauryl-1,4-pentazdiene, 1,3-di-p-tolyl-5-phenyl-1,4-pentazdiene, 1,3,5-tri-p-chlorophenyl-1,4-pentazdiene, 1,3,5-tri-p-tolyl-1,4-pentazdiene, 1,5-di-p-tolyl-3(beta-hydroxyethyl)-1,4-pentazdiene, and 1,5-diphenyl-1,4-pentazdiene.

The essential process step of this invention is the conversion of an aryl diazo compound, generally a diazonium salt, to a pentazdiene by reaction with a primary amine in the presence of a substantial quantity of a solvent comprising a substantial amount of a hydroxy or alkoxy ether, or of a cyclic diether such as a dioxane. In this reaction ammonia is considered to be a primary amine. The solvent may be an aqueous solution comprising such an ether or it may be such an ether without any substantial amount of water. As is well appreciated by those skilled in the art, diazo compounds are relatively unstable, and generally should be prepared shortly before use.

According to one embodiment of this invention, pentazdienes are prepared by a two-step process which comprises diazotization of an aryl amine in the first step followed by coupling the resulting product with an amine in the second step. In a more specific embodiment, and for the first step of this embodiment of the process, the aryl amine is diazotized, either in aqueous medium or in the presence of a water-soluble hydroxy or alkoxy ether, by adding a concentrated acid and then introducing a solution of a nitrite dropwise while the temperature of the reaction mixture is held around 0° C., say in the range from about —5° to about +5° C., the temperature generally being controlled by any conventional external cooling means. The reactants are stirred or otherwise agitated during the addition of the nitrite and stirring is continued until the reaction is complete. If the diazotization is carried out in aqueous medium a hydroxy or alkoxy ether such as, for example, ethylene glycol dimethyl ether is then added and the resulting solution cooled to about —5° C. prior to carrying out the second step of the synthesis.

For the pentazdiene preparation step of the synthesis, ammonia or an amine is dissolved in a mixture comprising an alkaline material and a hydroxy or alkoxy ether, in preparation for coupling with the diazonium compound prepared in the first step. The alkaline material preferred is an alkali metal hydroxide such as potassium hydroxide. The diazo solution is added to the amine solution or, if preferred, the amine solution may be added to the diazo solution, while the temperature is maintained at around −5° C., say in the range from about −10° to about 0° C., by any external cooling means or other method which will serve to control the temperature of the reaction. Subsequent to the addition of the diazo solution the reactor contents are cooled further, say to around −15° to −20° C., or as much lower as necessary to effect separation of solid pentazdiene, which is removed by any conventional method, such as filtration. The product thus separated is washed with water and dried, after which purification may be accomplished, if desired, by recrystallization. One method of recrystallization comprises dissolving the crude product in a suitable solvent, such as acetone, and adding ice water to precipitate the compound.

The hydroxy and alkoxy ethers applicable in this invention comprise compounds which are ethers of ethylene glycol, and may be represented by the formula R-O-CH$_2$-CH$_2$-O-R' wherein R may be an aryl group or an alkyl group containing not more than four carbon atoms and R' may be hydrogen or an alkyl group containing not more than four carbon atoms, or wherein R and R' may be comprised in a ring structure, as in a dioxane, such as 1,4-dioxane. While it is generally preferred and is usually more convenient to employ compounds which possess substantial water solubility, partially soluble hydroxy and alkoxy ethers may be used. Compounds possessing a water solubility of at least 10 per cent are considered the most desirable. Examples of these materials are the methyl, ethyl, propyl, butyl, and phenyl monoethers of ethylene glycol, the dialkyl ethers of ethylene glycol such as the dimethyl and diethyl ethers, mixed ethers of ethylene glycol, and also cyclic ethers such as a dioxane. The straight-chain ethers of ethylene glycol are commonly referred to as Cellosolves such as, for example, methyl Cellosolve, dimethyl Cellosolve, phenyl Cellosolve, and the like.

If the diazotization reaction is included as a part of the entire process, one should use a nitrite and an acid soluble in the solvent used. This step may be conducted either with water as the solvent, a water-ether mixture, or with a non-aqueous ether. With an aqueous solvent the nitrite is preferably sodium nitrite and the acid aqueous hydrochloric acid. If a nonaqueous ether is used, or if the proportion of water is so small as to make such inorganic reactants so little soluble as to be relatively unreactive, there should be used an organic nitrite, such as amyl nitrite or other alkyl nitrite having not more than about five carbon atoms in the alkyl group, and an organic acid, such as an acetic acid or other alkyl carboxylic acid having not more than about five carbon atoms per molecule. As is customary in diazotization, a slight stoichiometric excess of nitrite should be added.

The diazo solution used in the pentazdiene preparation step should contain the desired diazo compound in a concentration of about 1 to about 10 per cent by weight, preferably about 3 per cent, and if aqueous should contain at least about 20 per cent by weight of an ether, of the type previously discussed. The amine (which, as previously mentioned, may be ammonia) is employed in solution, in a concentration between about 0.3 and about 5 per cent by weight, the solution comprising at least about 20 per cent of an ether.

The molar ratio of total diazo compound to total amine added to this reaction is about 2:1. An alkali should also be added to this reaction step, preferably in the amine solution, in a molar ratio to the diazo compound of about 1.25:1 to about 1.5:1.

When hydroxy and alkoxy ethers are employed in the production of pentazdienes in the manner herein described, higher yields of the products are obtained than have heretofore been possible. These materials serve to promote the reaction and minimize decomposition. Ordinarily pentazdienes are regarded as being very unstable and this fact makes their preparation a difficult problem. The method of this invention alleviates this difficulty.

One important use of pentazdienes is in emulsion polymerization reactions where they function as initiators. They may be employed in any type emulsion polymerization recipe and satisfactory conversion rates are obtained whether they are used alone or in the presence of modifiers such as primary, secondary, or tertiary mercaptans. They are particularly applicable in ferricyanide activated recipes such as, for example, neutral ferricyanide recipes or those wherein alkaline reacting materials such as sodium hydroxide, trisodium phosphate, and the like are employed. This is all more fully discussed and disclosed in my copending application Serial No. 752,005, filed June 2, 1947.

Advantages of this invention are illustrated by the following examples. The reactants, and their proportions, and the other specific ingredients of the recipes are presented as being typical and should not be construed to limit the invention unduly.

*Example I*

The preparation of 1,5-di-p-tolyl-3(beta-hydroxyethyl)-1,4-pentazdiene was effected in the following manner: p-toluidine (10.7 grams) in 50 ml. water was diazotized by adding 21 ml. concentrated hydrochloric acid, stirring the resulting paste for about 30 minutes, followed by adding a solution of 7 grams sodium nitrite in 25 ml. water. The temperature of the reaction mixture was held at 0° C. by external cooling during the dropwise addition of the sodium nitrite. The mixture was stirred during the addition of the reactants and stirring was continued until the reaction was complete after which excess nitrous acid was destroyed by the addition of sulfonic acid. To the resulting solution of diazonium compound was added 250 ml. ethylene glycol dimethyl ether, after which the solution was cooled to −5° C. in preparation for coupling of the diazonium compound with monoethanol amine.

A solution of monoethanol amine was prepared by dissolving 3.35 grams of the amine in a mixture of 100 ml. ethylene glycol dimethyl ether, 200 ml. water, and 9 grams potassium hydroxide (90 per cent pure). This solution was cooled to −5° C. and added all at once to the diazonium solution prepared above. The mixture was stirred 50 minutes, after which time coupling was complete. A 67.5 per cent yield of the pentazdiene was obtained.

*Example II*

The preparation of 1,3,5-tri-p-chlorophenyl-1,4-pentazdiene was carried out as in Example I except that 12.7 grams p-chloroaniline was used instead of p-toluidine in the first step of the process and in the second step 6.4 grams of the same amine (p-chloroaniline) was employed. Conversion was substantially complete giving an almost quantitative yield of the pentazdiene.

*Example III*

The following procedure is employed for the production of 1,3,5-tri-p-tolyl-1,4-pentazdiene: p-toluidine (10.7 grams) in 50 ml. ethylene glycol dimethyl ether is diazotized by adding 18 grams glacial acetic acid followed by a solution of 14 grams amyl nitrite in 25 ml. ethylene glycol dimethyl ether. The temperature of the reaction mixture is maintained at 0° C. during the addition of the nitrite. The reactants are agitated continuously until the reaction is complete.

A mixture of 5.4 grams p-toluidine, 11.5 grams potassium hydroxide, and 300 ml. ethylene glycol dimethyl ether is prepared and cooled to −5° C. and added all at once to the diazonium solution prepared above. The reactants are stirred until coupling is complete. Upon cooling the product is crystallized and separated by conventional means.

As will be evident to those skilled in the art, various modifications of this invention can be made, or followed, in the light of the foregoing disclosure and discussion, without departing from the scope of the disclosure or from the scope of the claims.

I claim:

1. An improved process for producing 1,5-di-p-tolyl-3(beta-hydroxyethyl) 1,4-pentazdiene, which comprises diazotizing p-toluidine, dissolving the resulting diazo compound in ethylene glycol dimethyl ether, and cooling said solution to about −5° C., dissolving monoethanol amine and potassium hydroxide in aqueous ethylene glycol dimethyl ether and cooling said solution to about −5° C., admixing said solutions in such proportions that the molar ratio of potassium hydroxide to said diazo compound is between 1.25:1 and 1.5:1 and the molar ratio of said amine to said diazo compound is about 1:2 and effecting a reaction therebetween, and recovering a resulting pentazdiene so produced.

2. An improved process for producing 1,5-di-p-tolyl-3(beta-hydroxyethyl) 1,4-pentazdiene, which comprises reacting together a solution of a p-methylbenzene diazonium salt in a solvent comprising at least 20 per cent of an ether of ethylene glycol and a solution of monoethanol amine and potassium hydroxide in a solvent comprising at least 20 per cent of an ether of ethylene glycol, the total amounts of said reactants being such that about two mols of amine and at least about 1.25 mols of potassium hydroxide are present per mol of said diazonium salt, and recovering a resulting pentazdiene so produced.

3. An improved process for producing a 1,5-diaryl-1,4-pentazdiene, which comprises reacting together a solution of an aryl diazonium salt in a solvent comprising at least 20 per cent of an ether and an alkaline solution of a primary amine in a solvent comprising at least 20 per cent of an ether, said ether in each instance being an ether of ethylene glycol, the total amounts of said reactants being such that about two mols of said primary amine are present per mol of said diazonium salt and an alkaline compound is present in excess of the molar equivalent of said aryl diazonium salt, and recovering from products of said reaction a 1,5-diaryl-1,4-pentazdiene so produced.

4. The improved process of claim 3 wherein, in each instance, said ether is water-soluble and the solvent of each said solution comprises an aqueous solution of said ether.

5. The improved process of claim 4 wherein the reaction temperature is not greater than about 0° C., the aryl diazonium salt is present in said solution in a concentration between about 1 and about 10 per cent by weight, and the amine is present in said solution in a concentration between about 0.3 and about 5 per cent by weight.

6. The improved process of claim 3 wherein said ether, in each instance, is a diether.

7. The improved process of claim 3 wherein said ether, in each instance, is a hydroxy monoether.

8. The improved process of claim 3 wherein said ether, in each instance, is a cyclic diether.

9. The improved process of claim 3 wherein said ether, in each instance, is a 1,4-dioxane.

10. An improved process for producing a 1,5-diaryl-1,4-pentazdiene, which comprises reacting together at a reaction temperature not greater than about 0° C. an aryl diazonium salt and a primary amine while in a strongly alkaline liquid reaction medium comprising at least about 20 per cent by weight of an ether of ethylene glycol.

11. An improved process for producing a 1,5-diphenyl-1,4-pentazdiene, which comprises adding, to a solution containing 1 to 10 per cent by weight of a phenyl diazonium salt dissolved in an aqueous liquid containing at least 20 per cent of a dialkyl ether of ethylene glycol, a solution containing 0.3 to 5 per cent by weight of a primary amine dissolved in an aqueous liquid containing at least 20 per cent of a dialkyl ether of ethylene glycol and also containing an alkaline metal hydroxide in an amount of at least 1.25 mols per mol of said diazonium salt, said solutions being mixed and maintained at a reaction temperature not greater than 0° C., and recovering a resulting 1,5-diphenyl-1,4-pentazdiene so produced.

12. The process of claim 11 in which said phenyl diazonium salt is a p-tolyl diazonium salt, said primary amine is monoethanol amine, said ether is ethylene glycol dimethyl ether, and 1,5-di - p - tolyl - 3(beta - hydroxyethyl) - 1,4 - pentazdiene is produced and recovered as a product.

JOHN E. WICKLATZ.

REFERENCES CITED

The following references are of record in the file of this patent:

UNITED STATES PATENTS

| Number | Name | Date |
| --- | --- | --- |
| 2,136,456 | Moran | Nov. 15, 1938 |
| 2,335,730 | Blake | Nov. 30, 1943 |
| 2,188,262 | Crandall | Jan. 23, 1940 |

FOREIGN PATENTS

| Number | Country | Date |
| --- | --- | --- |
| 374,498 | Great Britain | June 13, 1932 |

OTHER REFERENCES

Griess, "Ueber eine neue Klasse organischer Vergindungen . . ." Annalen, vol. 121 (1862) pp. 257–280.

Pechmann, "Ueber aromatische Bisdiazoverbindungen," Berichte, vol. 27 (1894) pp. 703–706.

Goldschmidt, "Ueber die Disdiazoamidokorper," Berichte, vol. 22 (1889) pp. 933–942.